United States Patent
Brehaut et al.

(10) Patent No.: US 11,721,978 B2
(45) Date of Patent: Aug. 8, 2023

(54) SWITCHING VALVE

(71) Applicant: General Electric Technology GmbH, Baden (CH)

(72) Inventors: Stéphane Pierre Brehaut, Tours (FR); Guillaume De Preville, Elancourt (FR); Timothy Stott, Staffordshire (GB)

(73) Assignee: General Electric Technology GmbH, Baden (CH)

(*) Notice: Subject to any disclaimer, the term of this patent is extended or adjusted under 35 U.S.C. 154(b) by 200 days.

(21) Appl. No.: 17/485,205

(22) Filed: Sep. 24, 2021

(65) Prior Publication Data

US 2022/0103091 A1 Mar. 31, 2022

(30) Foreign Application Priority Data

Sep. 25, 2020 (EP) .................................... 20275149

(51) Int. Cl.
*H02J 3/36* (2006.01)
*H02M 7/483* (2007.01)
*H02J 3/38* (2006.01)

(52) U.S. Cl.
CPC ............. *H02J 3/36* (2013.01); *H02M 7/4835* (2021.05); *H02J 3/381* (2013.01); *H02J 2300/28* (2020.01)

(58) Field of Classification Search
CPC .......... H02J 3/36; H02J 3/381; H02J 2300/28; H02M 7/4835
See application file for complete search history.

(56) References Cited

U.S. PATENT DOCUMENTS

| 2017/0077797 A1* | 3/2017 | Stott ........................ H02M 1/32 |
| 2017/0123014 A1* | 5/2017 | Goetz ................... H02J 7/0024 |
| 2017/0237331 A1 | 8/2017 | Townsend et al. |

(Continued)

OTHER PUBLICATIONS

Extended European Search Report and Opinion issued in 20275150.9, dated Feb. 24, 2021, 10 pages.

(Continued)

*Primary Examiner* — Jue Zhang
*Assistant Examiner* — Lakaisha Jackson
(74) *Attorney, Agent, or Firm* — Eversheds Sutherland (US) LLP

(57) ABSTRACT

There is provided a switching valve for a voltage source converter. The switching valve comprises a plurality of modules, each module including at least one switching element and at least one energy storage device, the or each switching element and the or each energy storage device in each module arranged to be combinable to selectively provide a voltage source, the switching valve including a controller configured to selectively control the switching of the switching elements to select one or more of the modules to contribute a or a respective voltage to a switching valve voltage, wherein the controller is configured to selectively carry out a module selection by:
assigning each module with a respective address in an address queue;
in a respective one of a plurality of sampling events, selecting one or more voltage contributing modules in order of its assigned address in the address queue; and
between different sampling events, changing the order of selecting the or each voltage contributing module based on its assigned address in the address queue.

15 Claims, 5 Drawing Sheets

(56) References Cited

U.S. PATENT DOCUMENTS

| | | | |
|---|---|---|---|
| 2018/0069469 A1* | 3/2018 | Gupta | H02M 1/32 |
| 2019/0199213 A1* | 6/2019 | Jaldanki | H02M 1/0022 |
| 2021/0184596 A1* | 6/2021 | Frampton | H02M 1/0043 |

OTHER PUBLICATIONS

Sangwongwanich Ariya et al: "Two-Dimension Sorting and Selection Algorithm featuring Thermal Balancing Control for Modular Multilevel Converters", EPE '16 ECCE Europe, Sep. 5, 2016, pp. 1-10.

* cited by examiner

SWITCHING VALVE

CROSS-REFERENCE TO RELATED APPLICATION

This application claims the priority benefit of European Application No. 20275150.9, titled "Switching Valve", filed Sep. 25, 2020, which is incorporated herein by reference in its entirety.

This invention relates to a switching valve for a voltage source converter, a voltage source converter, a method of operating a switching valve for a voltage source converter and a method of operating a voltage source converter, preferably for use in high voltage direct current (HVDC) transmission.

In HVDC power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometer of the lines and/or cables, and thus becomes cost-effective when power needs to be transmitted over a long distance. DC power is also transmitted directly from offshore wind parks to onshore AC power transmission networks.

The conversion between DC power and AC power is utilised where it is necessary to interconnect DC and AC networks. In any such power transmission network, converters (i.e. power converters) are required at each interface between AC and DC power to affect the required conversion from AC to DC or from DC to AC.

According to a first aspect of the invention, there is provided a switching valve for a voltage source converter, the switching valve comprising a plurality of modules, each module including at least one switching element and at least one energy storage device, the or each switching element and the or each energy storage device in each module arranged to be combinable to selectively provide a voltage source, the switching valve including a controller configured to selectively control the switching of the switching elements to select one or more of the modules to contribute a or a respective voltage to a switching valve voltage, wherein the controller is configured to selectively carry out a module selection by:
assigning each module with a respective address in an address queue;
in a respective one of a plurality of sampling events, selecting one or more voltage contributing modules in order of its assigned address in the address queue; and
between different sampling events, changing the order of selecting the or each voltage contributing module based on its assigned address in the address queue.

During operation of the voltage source converter, one or more of the modules are selected to contribute a or a respective voltage to the switching valve voltage. The level of the switching valve voltage depends on the power requirements at the given point in time and will require a voltage contribution from a single module or a plurality of modules.

Conventionally the modules are assigned with respective addresses that increase in number in an address queue, and the or each voltage contributing module is selected in increasing order of its assigned address in the address queue. However, since the same increasing order is used for each instance ('sampling event'), there is a tendency to select the or each voltage contributing module from the modules with the lower numerical addresses over the modules with the higher numerical addresses. As a result, the modules with the lower numerical addresses are switched into and out of circuit more often, and thereby experience higher switching frequencies, in comparison to the modules with the higher numerical addresses. This in turn results in a switching frequency imbalance between the modules with the lower numerical addresses and the modules with the higher numerical addresses. The conventional module selection process therefore not only causes additional thermal stress due to higher commutation losses in the modules with the lower numerical addresses and creates thermal hot spots in the switching valve but also reduces a safety margin in terms of the thermal stress of the modules, thus reducing the reliability and lifetime of the switching valve and increasing the complexity of an associated cooling system.

Through the configuration of the controller of the invention to change the order of selecting the or each voltage contributing module based on its assigned address in the address queue between different sampling events, the switching of the modules can be regulated to reduce variance or achieve balance between the switching frequencies of the modules. Such optimisation of the module selection process can be carried out without requiring any additional modification of the module and switching valve hardware, and can be readily integrated into any switching algorithm strategy.

The configuration of the controller of the invention therefore not only provides the switching valve with reductions in thermal stress due to better distribution of commutation losses between the modules and attenuation of thermal hotspots in the switching valve but also increases the safety margin in terms of the thermal stress of the modules, thus increasing the reliability and prolonging the lifetime of the switching valve and reducing cooling system complexity. Due to the reduction in thermal stress, it becomes possible to increase the current and/or power through the switching valve for a given number of modules without overheating.

In embodiments of the invention, the controller may be configured to selectively carry out the module selection by:
assigning each module to a respective one of a plurality of sampling bins, each sampling bin corresponding to a module voltage level or a module voltage band;
assigning each module with a respective address in an address queue of the respective sampling bin;
in each sampling event, selecting the or each voltage contributing module in order of its assigned address in the address queue of the respective sampling bin; and
between different sampling events, changing the order of selecting the or each voltage contributing module based on its assigned address in the address queue of the respective sampling bin.

Configuration of the controller in this manner enables the invention to be applied to switching valves for which the module selection process involves selecting one or more voltage contributing modules from a plurality of sampling bins, where each sampling bin includes one or more modules that have a specific voltage level or are within a specific voltage band. Specifically, each sampling bin has its own address queue, and application of the invention to each sampling bin enables overall regulation of the switching of the modules to reduce variance or achieve balance between the switching frequencies of the modules.

The inventors have devised several new ways of changing the order of selecting the or each voltage contributing module based on its assigned address in the address queue between different sampling events in order to reduce the variance in switching frequency between the modules, non-limiting examples of which are described as follows.

In embodiments of the invention, the controller may be configured to selectively carry out the module selection by, between different sampling events, switching between: selecting the or each voltage contributing module in forward order of its assigned address in the address queue; and selecting the or each voltage contributing module in reverse order of its assigned address in the address queue.

When the modules are assigned with respective addresses that increase in number in an address queue, the or each voltage contributing module is selected in increasing order of its assigned address in the address queue in a sampling event, and the or each voltage contributing module is selected in decreasing order of its assigned address in the address queue in another sampling event.

In other embodiments of the invention, the controller may be configured to selectively carry out the module selection by, between different sampling events, starting at a different position in the address queue when selecting the or each voltage contributing module in order of its assigned address in the address queue. In such embodiments, the controller may be configured to selectively carry out the module selection by, between different sampling events, starting at a different position in the address queue when selecting the or each voltage contributing module in forward or reverse order of its assigned address in the address queue.

In this way, the module selection process selects the or each voltage contributing module starting from a different module in each sampling event, thus achieving a better distribution of voltage contributing module selection among the modules in comparison to the conventional way of using only an increasing order to select the or each voltage contributing module.

In still other embodiments of the invention, the controller may be configured to selectively carry out the module selection by, in each sampling event, selecting the or each voltage contributing module in random, quasi-random or pseudo-random order of its assigned address in the address queue.

Instead of relying on only an increasing order to select the or each voltage contributing module, the use of a random, quasi-random or pseudo-random order randomises the selection of the or each voltage contributing module irrespective of their position in the address queue. This provides a balanced distribution of voltage contributing module selection among the modules.

Each of the above exemplary new ways of the module selection process of the invention removes the tendency to select the or each voltage contributing module from the modules with the lower numerical addresses over the modules with the higher numerical addresses and thereby provides effective means for reducing switching frequency variance between the modules or balancing switching frequencies of the modules, thus achieving the aforementioned associated benefits.

In a preferred embodiment of the invention, the different sampling events are consecutive sampling events. It will however be appreciated that the different sampling events may instead be sequential with one or more other sampling events separating the different sampling events.

According to a second aspect of the invention, there is provided a voltage source converter comprising a switching valve according to any one of the first aspect of the invention and its embodiments.

The features and advantages of the switching valve of the first aspect of the invention and its embodiments apply mutatis mutandis to the features and advantages of the voltage source converter of the second aspect of the invention and its embodiments.

It will be appreciated that the switching valve of the invention is also applicable to other types of switching assemblies and equipment.

According to a third aspect of the invention, there is provided a method of operating a switching valve for a voltage source converter, the switching valve comprising a plurality of modules, each module including at least one switching element and at least one energy storage device, the or each switching element and the or each energy storage device in each module arranged to be combinable to selectively provide a voltage source, the method comprising the steps of:
  controlling the switching of the switching elements to select one or more of the modules to contribute a or a respective voltage to a switching valve voltage;
  carrying out a module selection by:
    assigning each module with a respective address in an address queue;
    in a respective one of a plurality of sampling events, selecting one or more voltage contributing modules in order of its assigned address in the address queue; and
    between different sampling events, changing the order of selecting the or each voltage contributing module based on its assigned address in the address queue.

The features and advantages of the switching valve of the first aspect of the invention and its embodiments apply mutatis mutandis to the features and advantages of the method of the third aspect of the invention and its embodiments.

The method of the invention may include the step of carrying out the module selection by:
  assigning each module to a respective one of a plurality of sampling bins, each sampling bin corresponding to a module voltage level or a module voltage band;
  assigning each module with a respective address in an address queue of the respective sampling bin;
  in each sampling event, selecting the or each voltage contributing module in order of its assigned address in the address queue of the respective sampling bin; and
  between different sampling events, changing the order of selecting the or each voltage contributing module based on its assigned address in the address queue of the respective sampling bin.

In embodiments of the invention, the method may include the step of carrying out the module selection by, between different sampling events, switching between: selecting the or each voltage contributing module in forward order of its assigned address in the address queue; and selecting the or each voltage contributing module in reverse order of its assigned address in the address queue.

In other embodiments of the invention, the method may include the step of carrying out the module selection by, between different sampling events, starting at a different position in the address queue when selecting the or each voltage contributing module in order of its assigned address in the address queue. In such embodiments, the method may include the step of carrying out the module selection by, between different sampling events, starting at a different position in the address queue when selecting the or each voltage contributing module in forward or reverse order of its assigned address in the address queue.

In still other embodiments of the invention, the method may include the step of carrying out the module selection by, in each sampling event, selecting the or each voltage contributing module in random, quasi-random or pseudo-random order of its assigned address in the address queue.

In the method of the invention, the different sampling events may be, but are not limited to, consecutive sampling events.

According to a fourth aspect of the invention, there is provided a method of operating a voltage source converter comprising a switching valve, the method comprising the step of operating a switching valve in accordance with any one of the third aspect of the invention and its embodiments.

The features and advantages of the first, second and third aspects of the invention and their embodiments apply mutatis mutandis to the features and advantages of the method of the fourth aspect of the invention and its embodiments.

Each module may vary in configuration, non-limiting examples of which are set out as follows.

In a first exemplary configuration of a module, the or each switching element and the or each energy storage device in the module may be arranged to be combinable to selectively provide a unidirectional voltage source. For example, the module may include a pair of switching elements connected in parallel with an energy storage device in a half-bridge arrangement to define a 2-quadrant unipolar module that can provide zero or positive voltage and can conduct current in two directions.

In a second exemplary configuration of a module, the or each switching element and the or each energy storage device in the module may be arranged to be combinable to selectively provide a bidirectional voltage source. For example, the module may include two pairs of switching elements connected in parallel with an energy storage device in a full-bridge arrangement to define a 4-quadrant bipolar module that can provide negative, zero or positive voltage and can conduct current in two directions.

The plurality of modules may be connected in series to define a chain-link converter. The structure of the chain-link converter permits build-up of a combined voltage across the chain-link converter, which is higher than the voltage available from each of its individual modules, via the insertion of the energy storage devices of multiple modules, each providing its own voltage, into the chain-link converter. In this manner switching of the or each switching element in each module causes the chain-link converter to provide a stepped variable voltage source, which permits the generation of a voltage waveform across the chain-link converter using a step-wise approximation. Hence the chain-link converter is capable of providing a wide range of complex voltage waveforms.

At least one switching element may be a wide-bandgap material based switching element or a silicon semiconductor based switching element. Examples of wide-bandgap materials include, but are not limited to, silicon carbide, boron nitride, gallium nitride and aluminium nitride.

At least one switching element may include at least one self-commutated switching device. The or each self-commutated switching device may be an insulated gate bipolar transistor (IGBT), a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated switching device. The number of switching devices in each switching element may vary depending on the required voltage and current ratings of that switching element.

At least one switching element may further include a passive current check element that is connected in anti-parallel with the or each switching device. The or each passive current check element may include at least one passive current check device. The or each passive current check device may be any device that is capable of limiting current flow in only one direction, e.g. a diode. The number of passive current check devices in each passive current check element may vary depending on the required voltage and current ratings of that passive current check element.

Each energy storage device may be any device that is capable of storing and releasing energy to selectively provide a voltage, e.g. a capacitor, fuel cell or battery.

The configuration of the voltage source converter may vary depending on its operating requirements.

In embodiments of the invention, the voltage source converter may include at least one converter limb, the or each converter limb extending between first and second DC terminals, the or each converter limb including first and second limb portions separated by an AC terminal, each limb portion including a switching valve according to any one of the first aspect of the invention and its embodiments.

In a preferred embodiment of the invention, the voltage source converter includes three converter limbs, each of which is connectable via the respective AC terminal to a respective phase of a three-phase AC network. It will be appreciated that the voltage source converter may include a different number of converter limbs, each of which is connectable via the respective AC terminal to a respective phase of an AC network with the corresponding number of phases.

It will be appreciated that the use of the terms "first" and "second", and the like, in this patent specification is merely intended to help distinguish between similar features (e.g. the first and second limb portions, etc.), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

A preferred embodiment of the invention will now be described, by way of a non-limiting example, with reference to the accompanying drawings in which.

Figure 1:
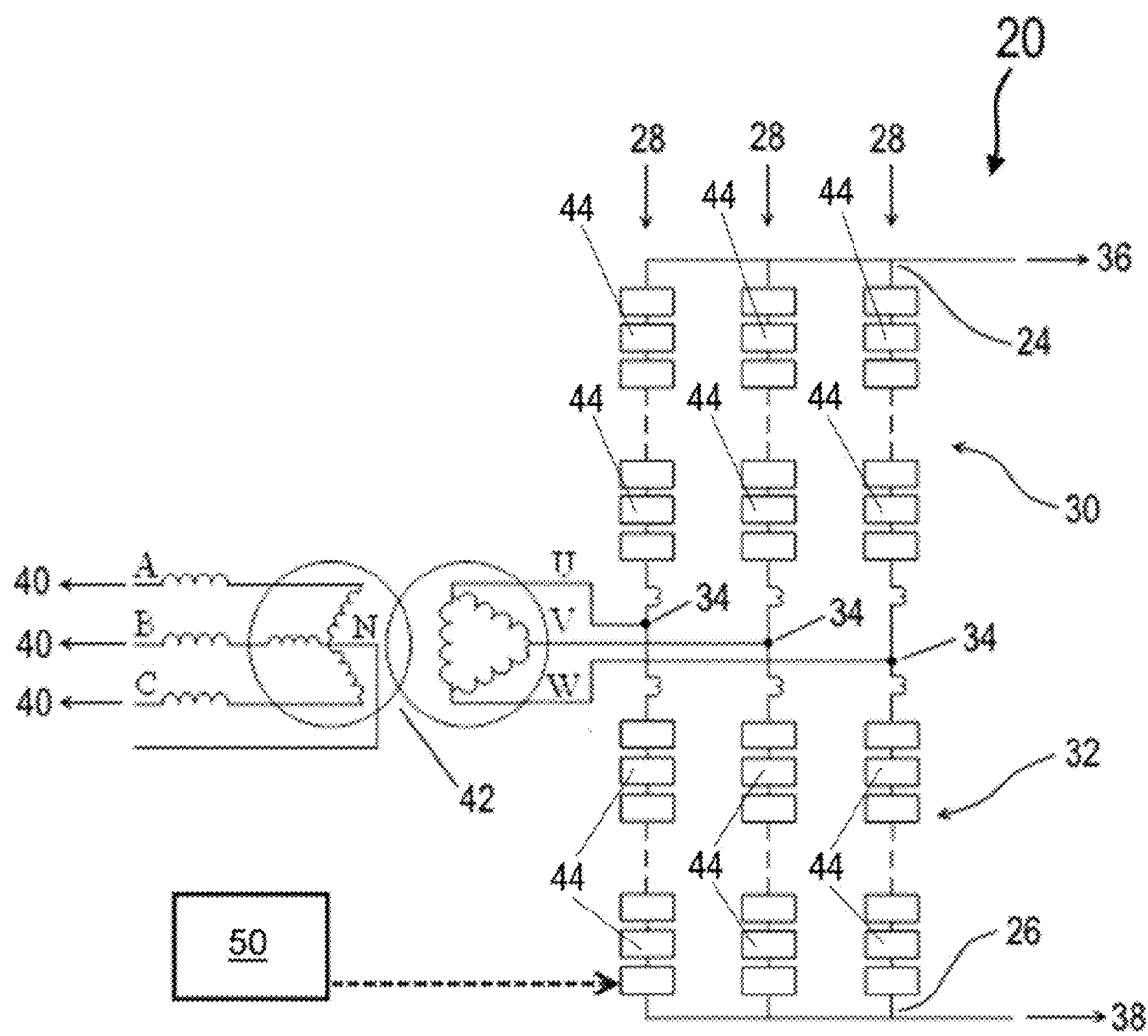
FIG. 1 shows a voltage source converter according to an embodiment of the invention.
Figure 4:
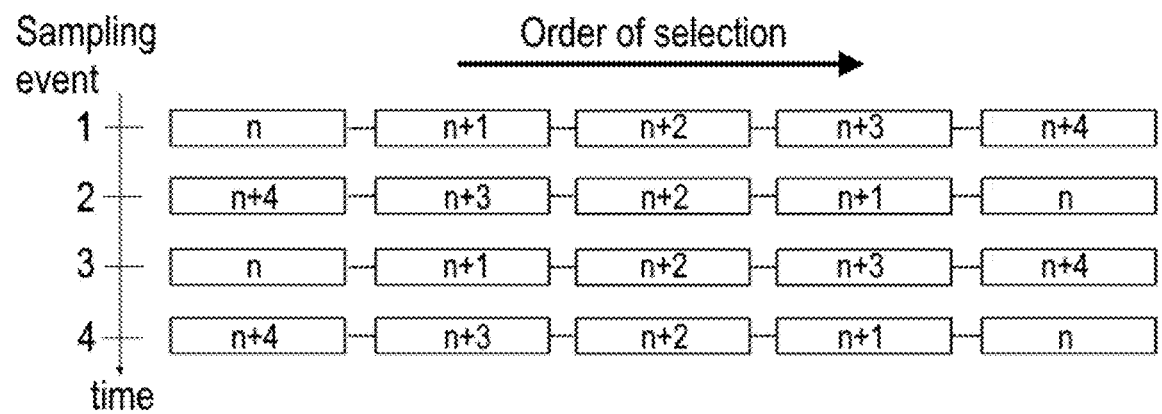
FIG. 4 illustrates a first module selection process of the voltage source converter of FIG. 1.
Figure 5:
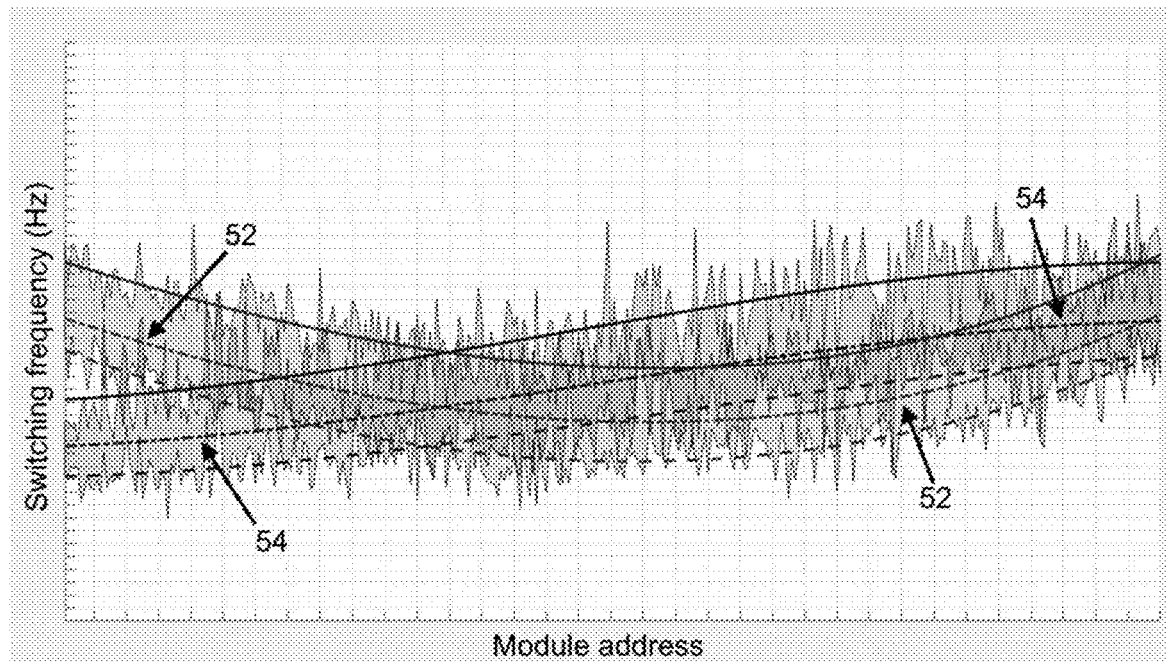
Figure 6:
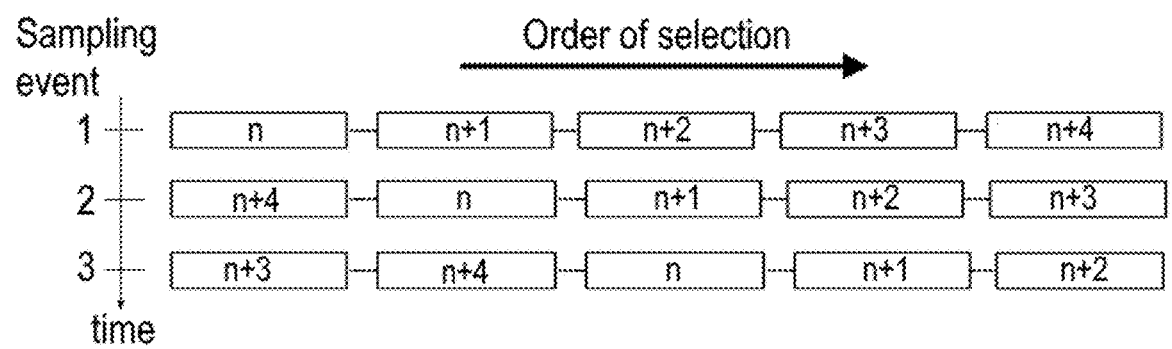
Figure 7:
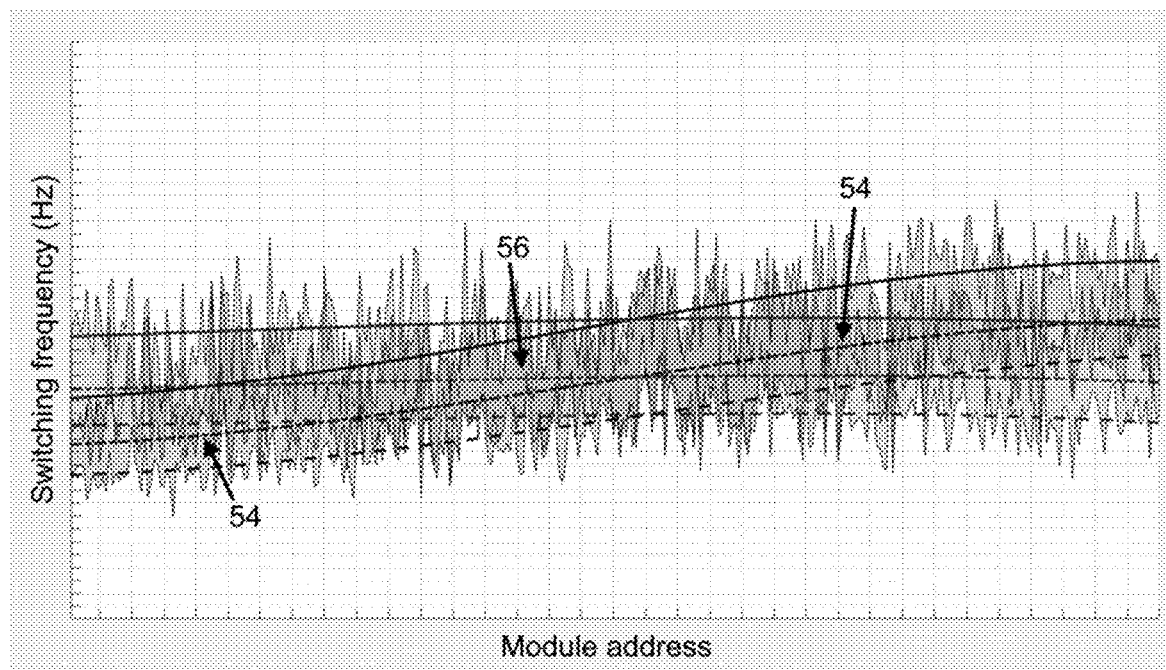
Figure 8:
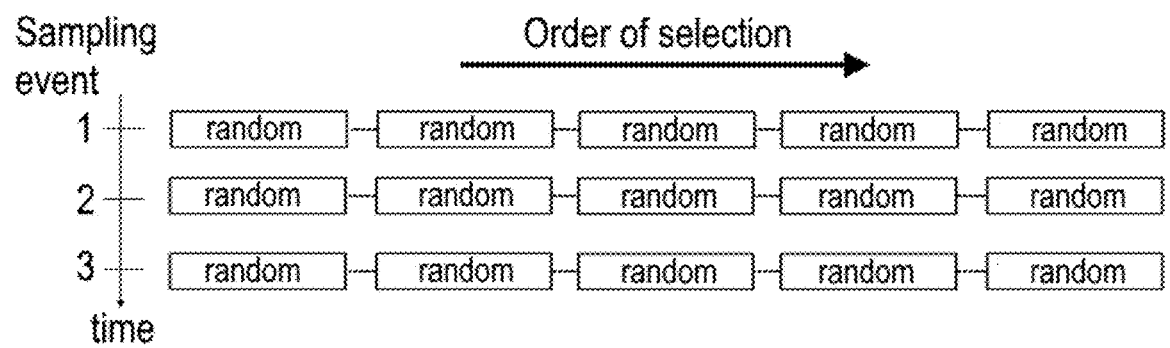
Figure 9:
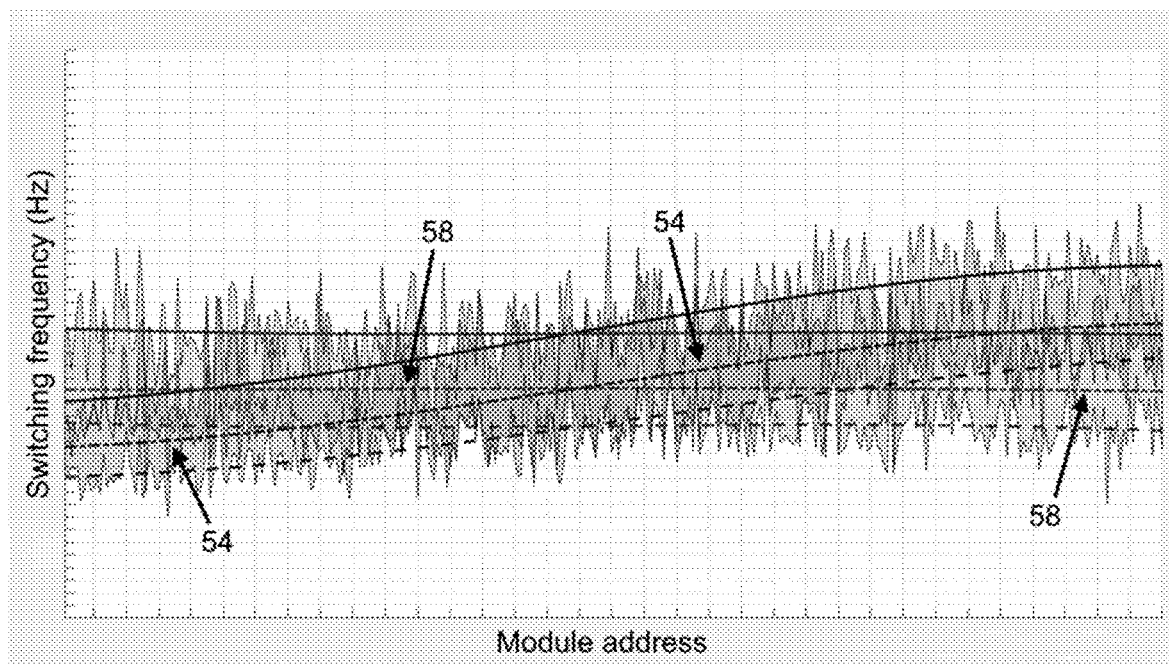

FIG. 5 compares the switching frequencies of the modules using a conventional module selection process and the first module selection process of FIG. 4;

FIG. 6 illustrates a second module selection process of the voltage source converter of FIG. 1;

FIG. 7 compares the switching frequencies of the modules using a conventional module selection process and the second module selection process of FIG. 6;

FIG. 8 illustrates a third module selection process of the voltage source converter of FIG. 1; and FIG. 9 compares the switching frequencies of the modules using a conventional module selection process and the third module selection process of FIG. 8.

The figures are not necessarily to scale, and certain features and certain views of the figures may be shown exaggerated in scale or in schematic form in the interests of clarity and conciseness.

The following embodiment of the invention is used primarily in HVDC applications, but it will be appreciated that the following embodiment of the invention is applicable mutatis mutandis to other applications operating at different voltage levels. The following embodiment of the invention is described with reference to an AC-DC voltage source converter, but it will be appreciated that the following embodiment of the invention is applicable mutatis mutandis to other types of converters, including AC-AC converters and DC-DC converters, and other type of switching assemblies and equipment.

A voltage source converter according to an embodiment of the invention is shown in FIG. 1 and is designated generally by the reference numeral 20.

The voltage source converter 20 includes first and second DC terminals 24,26 and a plurality of converter limbs 28. Each converter limb 28 extends between the first and second DC terminals 24,26 and includes first and second limb portions 30,32 separated by a respective AC terminal 34. In each converter limb 28, the first limb portion 30 extends between the first DC terminal 24 and the AC terminal 34, while the second limb portion 32 extends between the second DC terminal 26 and the AC terminal 34.

In use, the first and second DC terminals 24,26 of the voltage source converter 20 are respectively connected to a DC network 36,38. In use, the AC terminal 34 of each converter limb 28 of the voltage source converter 20 is connected to a respective AC phase of a three-phase AC network 40 via a star-delta transformer arrangement 42. It is envisaged that in other embodiments of the invention the transformer arrangement 42 may be a star-star transformer arrangement, may be another type of transformer arrangement or may be omitted altogether. The three-phase AC network 40 is an AC power grid 40.

Each limb portion 30,32 includes a switching valve, which includes a chain-link converter that is defined by a plurality of series-connected modules 44.

Each module 44 may vary in topology, examples of which are described as follows.

Figure 2:
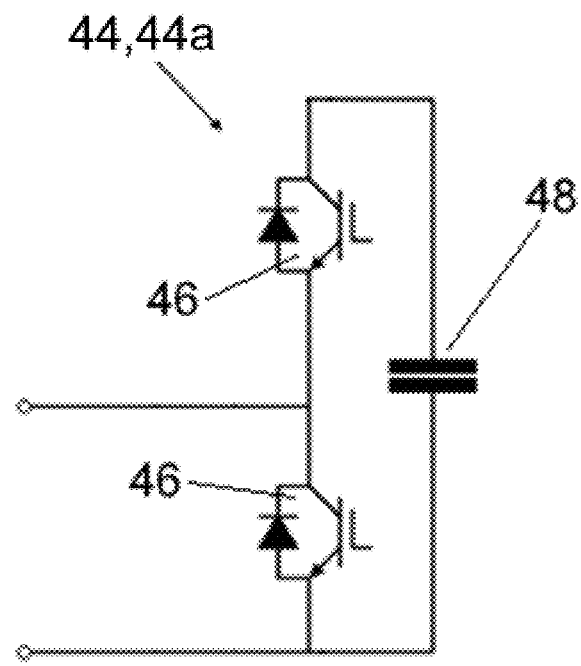
FIG. 2 shows a schematic view of an exemplary half-bridge chain-link module.

FIG. 2 shows schematically the structure of an exemplary module 44 in the form of a half-bridge module 44a. The half-bridge module 44a includes a pair of switching elements 46 and a capacitor 48. Each switching element 46 of the half-bridge module 44a is in the form of an IGBT which is connected in parallel with an anti-parallel diode. The pair of switching elements 46 are connected in parallel with the capacitor 48 in a half-bridge arrangement to define a 2-quadrant unipolar module 44a that can provide zero or positive voltage and can conduct current in both directions.

Figure 3:
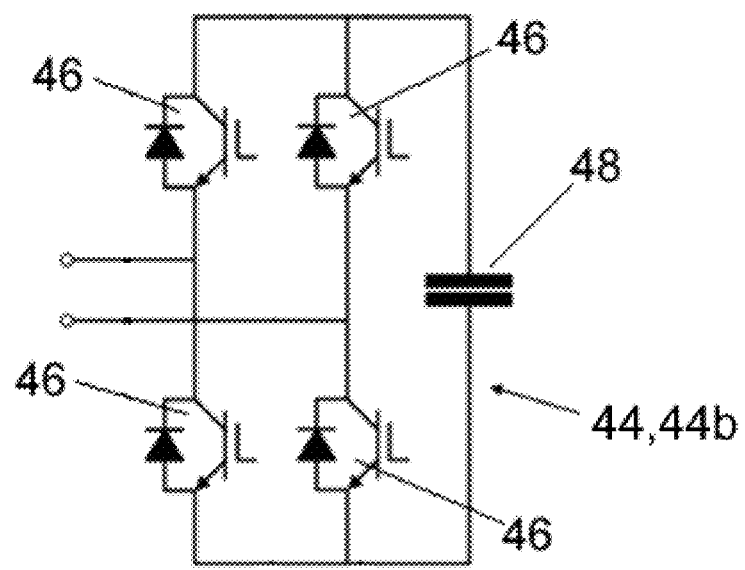
FIG. 3 shows a schematic view of an exemplary full-bridge chain-link module.

FIG. 3 shows schematically the structure of an exemplary module 44 in the form of a full-bridge module 44b. The full-bridge module 44b includes two pairs of switching elements 46 and a capacitor 48. Each switching element 46 of the full-bridge module 44b is in the form of an IGBT which is connected in parallel with an anti-parallel diode. The pairs of switching elements 46 are connected in parallel with the capacitor 48 in a full-bridge arrangement to define a 4-quadrant bipolar module 44b that can provide negative, zero or positive voltage and can conduct current in both directions.

The structure of a given module 44 includes the arrangement and type of switching elements 46 and energy storage device 48 used in the given module 44. It will be appreciated that it is not essential for all of the modules 44 to have the same module structure. For example, the plurality of modules 44 may comprise a combination of half-bridge modules 44a and full-bridge modules 44b.

It is envisaged that, in other embodiments of the invention, each switching element 46 of each module 44 may be replaced by a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated semiconductor device. It is also envisaged that, in other embodiments of the invention, each diode may be replaced by a plurality of series-connected diodes.

The capacitor 48 of each module 44 is selectively bypassed or inserted into the corresponding chain-link converter by changing the states of the switching elements 46. This selectively directs current through the capacitor 48 or causes current to bypass the capacitor 48, so that the module 44 provides a zero or non-zero voltage.

The capacitor 48 of the module 44 is bypassed when the switching elements 46 in the module 44 are configured to form a short circuit in the module 44, whereby the short circuit bypasses the capacitor 48. This causes current in the corresponding chain-link converter to pass through the short circuit and bypass the capacitor 48, and so the module 44 provides a zero voltage, i.e. the module 44 is configured in a bypassed mode.

The capacitor 48 of the module 44 is inserted into the corresponding chain-link converter when the switching elements 46 in the module 44 are configured to allow the current in the corresponding chain-link converter to flow into and out of the capacitor 48. The capacitor 48 then charges or discharges its stored energy so as to provide a non-zero voltage, i.e. the module 44 is configured in a non-bypassed mode.

In this manner the switching elements 46 in each module 44 are switchable to control flow of current through the corresponding capacitor 48.

It is possible to build up a combined voltage across each chain-link converter, which is higher than the voltage available from each of its individual modules 44, via the insertion of the capacitors of multiple modules 44, each providing its own voltage, into each chain-link converter. In this manner switching of the switching elements 46 in each module 44 causes each chain-link converter to provide a stepped variable voltage source, which permits the generation of a voltage waveform across each chain-link converter using a step-wise approximation. Hence, the switching elements 46 in each limb portion 30,32 are switchable to selectively permit and inhibit flow of current through the corresponding capacitor 48 in order to control a voltage across the corresponding limb portion 30,32.

It is envisaged that, in other embodiments of the invention, each module 44 may be replaced by another type of module which includes at least one switching element and at least one energy storage device, the or each switching element and the or each energy storage device in each such module arranged to be combinable to selectively provide a voltage source.

It is also envisaged that, in other embodiments of the invention, the capacitor 48 in each module 44 may be replaced by another type of energy storage device which is capable of storing and releasing energy to provide a voltage, e.g. a battery or a fuel cell.

The voltage source converter further includes a controller 50 configured, e.g. programmed, to control the switching of the switching elements 46.

For the purposes of simplicity, the controller 50 is exemplarily described with reference to its implementation as a single control unit. In other embodiments, the controller 50 may be implemented as a plurality of control units. The configuration of the controller 50 may vary depending on specific requirements of the voltage source converter 20. For example, the controller 50 may include a plurality of control units, each of which is configured to control the switching of the switching elements 46 of a respective one of the modules 44.

Each control unit may be configured to be internal to, or external of the corresponding module 44. Alternatively, the controller may include a combination of one or more control units internal to the corresponding module 44 and one or more control units external of the corresponding module 44. Each control unit may be configured to communicate with at least one other control unit via telecommunications links.

Operation of the voltage source converter 20 is described as follows with reference to FIGS. 4 to 9.

In order to transfer power between the DC and AC networks 36,38,40, the controller 54 controls the switching of the switching elements 46 of the modules 44 to switch the capacitors 48 of the respective limb portions 30,32 into and out of circuit between the respective DC and AC terminals 24,26,34 to interconnect the DC and AC networks 36,38,40. The controller 54 switches the switching elements 46 of the modules 44 of each limb portion 30,32 to provide a stepped variable voltage source between the respective DC and AC terminals 24,26,34 and thereby generate a voltage waveform so as to control the configuration of an AC voltage waveform at the corresponding AC terminal 34 to facilitate the transfer of power between the DC and AC networks 36,38,40.

The controller 50 employs a switching algorithm strategy in the form of a module selection process to select the most appropriate modules 44 based on their voltage levels to contribute their voltages so that each switching valve presents a respective switching valve voltage that corresponds to a control voltage reference at any point in time. Preferably the voltage contributing modules 44 are selected to enable balancing of their voltage levels of the modules 44.

In each switching valve, the modules 44 are assigned to different sampling bins based on their voltage levels. Each sampling bin represents a voltage range, e.g. between 2000 V and 2004 V at 4 volts per bit, and may include several modules, e.g. several dozen, that have the same voltage level or are within the same voltage band. In each sampling bin, each module 44 is assigned with a respective address in an address queue. The module selection process is configured to, in each sampling event, choose the sampling bin with the appropriate voltage level or band and then select the or each voltage contributing module 44 in order of its assigned address in the address queue of the chosen sampling bin.

The module selection process of the invention may be carried out using one of three exemplary ways, each of which is illustrated in FIGS. 4, 6 and 8. The purpose of these module selection processes is to reduce variance or achieve balance between the switching frequencies of the modules 44 by changing the order of selecting the or each voltage contributing module 44 based on its assigned address in the address queue of the respective sampling bin between different sampling events.

In a first module selection process shown in FIG. 4, the controller 50 carries out the module selection by alternating between:
  selecting the or each voltage contributing module 44 in forward order, in this case increasing order, of its assigned address in the address queue of the respective sampling bin. That is to say, the controller 50 starts its module selection from the module with the lowest numerical address and, if necessary, continues its module selection in increasing order of the numerical addresses of the modules 44; and
  selecting the or each voltage contributing module 44 in reverse order, in this case decreasing order, of its assigned address in the address queue of the respective sampling bin. That is to say, the controller 50 starts its module selection from the module 44 with the highest numerical address and, if necessary, continues its module selection in decreasing order of the numerical addresses of the modules 44.

This results in a symmetrical distribution of the switching frequencies 52 of the modules 44 in the same switching valve, as shown in FIG. 5, in which the mean variance of the switching frequencies 52 of the modules 44 is halved in comparison to the conventional module selection process for the mean variance of the switching frequencies 54 of the modules 44 for the same voltage source converter configuration and operation.

In a second module selection process shown in FIG. 6, the controller 50 carries out the module selection by, at each sampling event, starting at a different position in the address queue when selecting the or each voltage contributing module in order of its assigned address in the address queue of the respective sampling bin. In such a module selection, after the initial starting position is chosen, the controller 50 selects the or each voltage contributing module 44 in forward or reverse order of its assigned address in the address queue of the respective sampling bin. The starting module 44 may correspond to any one of the modules 44 in the address queue. At each sampling event, the address of the module 44 corresponding to the starting position is incrementally or decrementally changed. In one example illustrated by FIG. 6, the controller 50 in a first sampling event may start at the module 44 with the lowest numerical address, in a second sampling event start at the module 44 with the highest numerical address and in a third sampling event start at the module 44 with the second highest numerical address. In another example, the controller 50 in a first sampling event may start at the module 44 with the lowest numerical address, in a second sampling event start at the module 44 with the second lowest numerical address and in a third sampling event start at the module 44 with the third lowest numerical address.

The second module selection process forces the natural equal utilisation of each module 44 in the sampling bins that results in a near-balanced distribution of the switching frequencies of the modules 44 in the same switching valve, as shown in FIG. 7, in which the mean variance of the switching frequencies 56 of the modules 44 is reduced by two-thirds in comparison to the conventional module selection process for the mean variance of the switching frequencies 54 of the modules 44 for the same voltage source converter configuration and operation.

In a third module selection process shown in FIG. 8, the controller 50 carries out the module selection by, in each sampling event, selecting the or each voltage contributing module 44 in random, quasi-random or pseudo-random order of its assigned address in the address queue of the respective sampling bin. At each sampling event, the controller 50 randomly chooses the address of the starting module 44 and then randomly chooses the address of each subsequent module 44.

The third module selection process equalizes the switching frequencies of the modules 44 in the same switching valve, as shown in FIG. 9, in which the mean variance of the switching frequencies 58 of the modules 44 is reduced by four-fifths in comparison to the conventional module selection process for the mean variance of the switching frequencies 54 of the modules 44 for the same voltage source converter configuration and operation. Also, the instantaneous maximum and minimum voltages of the capacitors 48 of the modules 44 using the third module selection process are the same as the instantaneous maximum and minimum voltages of the capacitors 48 of the modules 44 using the conventional module selection process.

The reduction in the modules' switching frequency variance using the first, second and third module selection processes provides benefits in the form of reductions in thermal stress due to better distribution of commutation losses between the modules 44 and attenuation of thermal hotspots in the switching valves and also in the form of increased safety margin in terms of the thermal stress of the modules 44. This not only increases the reliability and lifetime of the switching valves and reduces cooling system complexity, but also makes it possible to increase the current and/or power through the switching valves for a given number of modules 44 without overheating. As a result, there are fewer technical constraints in terms of the design and operation of the switching valves when using the module selection process of the invention in comparison to using the conventional module selection process.

It will be appreciated that the above numerical values are merely intended to help illustrate the working of the invention and may vary depending on the requirements of the voltage source converter and the power application.

The listing or discussion of apparently prior-published document or information in this specification should not necessarily be taken as an acknowledgement that the document or information is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. A switching valve for a voltage source converter, the switching valve comprising a plurality of modules, each module including at least one switching element and at least one energy storage device, the or each switching element and the or each energy storage device in each module arranged to be combinable to selectively provide a voltage source, the switching valve including a controller configured to selectively control the switching of the switching elements to select one or more of the modules to contribute a or a respective voltage to a switching valve voltage,
wherein the controller is configured to selectively carry out a module selection by:
assigning each module with a respective address in an address queue;
in a respective one of a plurality of sampling events, selecting one or more voltage contributing modules in order of its assigned address in the address queue; and
between different sampling events, changing the order of selecting the or each voltage contributing module based on its assigned address in the address queue.

2. The switching valve according to claim 1, wherein the controller is configured to selectively carry out the module selection by:
assigning each module to a respective one of a plurality of sampling bins, each sampling bin corresponding to a module voltage level or a module voltage band;
assigning each module with a respective address in an address queue of the respective sampling bin;
in each sampling event, selecting the or each voltage contributing module in order of its assigned address in the address queue of the respective sampling bin; and
between different sampling events, changing the order of selecting the or each voltage contributing module based on its assigned address in the address queue of the respective sampling bin.

3. The switching valve according to claim 1, wherein the controller is configured to selectively carry out the module selection by, between different sampling events, switching between: selecting the or each voltage contributing module in forward order of its assigned address in the address queue; and selecting the or each voltage contributing module in reverse order of its assigned address in the address queue.

4. The switching valve according to claim 1, wherein the controller is configured to selectively carry out the module selection by, between different sampling events, starting at a different position in the address queue when selecting the or each voltage contributing module in order of its assigned address in the address queue.

5. The switching valve according to claim 1, wherein the controller is configured to selectively carry out the module selection by, between different sampling events, starting at a different position in the address queue when selecting the or each voltage contributing module in forward or reverse order of its assigned address in the address queue.

6. The switching valve according to claim 1, wherein the controller is configured to selectively carry out the module selection by, in each sampling event, selecting the or each voltage contributing module in random, quasi-random or pseudo-random order of its assigned address in the address queue.

7. The switching valve according to claim 1, wherein the different sampling events are consecutive sampling events.

8. A voltage source converter comprising a switching valve according to claim 1.

9. A method of operating a switching valve for a voltage source converter, the switching valve comprising a plurality of modules, each module including at least one switching element and at least one energy storage device, the or each switching element and the or each energy storage device in each module arranged to be combinable to selectively provide a voltage source, the method comprising:
controlling the switching of the switching elements to select one or more of the modules to contribute a or a respective voltage to a switching valve voltage;
carrying out a module selection by:
assigning each module with a respective address in an address queue;
in a respective one of a plurality of sampling events, selecting one or more voltage contributing modules in order of its assigned address in the address queue; and between different sampling events, changing the order of selecting the or each voltage contributing module based on its assigned address in the address queue.

10. The method according to claim 9, further comprising carrying out the module selection by:

assigning each module to a respective one of a plurality of sampling bins, each sampling bin corresponding to a module voltage level or a module voltage band;

assigning each module with a respective address in an address queue of the respective sampling bin;

in each sampling event, selecting the or each voltage contributing module in order of its assigned address in the address queue of the respective sampling bin; and between different sampling events, changing the order of selecting the or each voltage contributing module based on its assigned address in the address queue of the respective sampling bin.

11. The method according to claim 9, further comprising carrying out the module selection by, between different sampling events, switching between: selecting the or each voltage contributing module in forward order of its assigned address in the address queue; and selecting the or each voltage contributing module in reverse order of its assigned address in the address queue.

12. The method according to claim 9, further comprising carrying out the module selection by, between different sampling events, starting at a different position in the address queue when selecting the or each voltage contributing module in order of its assigned address in the address queue.

13. The method according to claim 9, further comprising carrying out the module selection by, between different sampling events, starting at a different position in the address queue when selecting the or each voltage contributing module in forward or reverse order of its assigned address in the address queue.

14. The method according to claim 9, further comprising carrying out the module selection by, in each sampling event, selecting the or each voltage contributing module in random, quasi-random or pseudo-random order of its assigned address in the address queue.

15. The method according to claim 9, wherein the different sampling events are consecutive sampling events.

\* \* \* \* \*